Sheet 1 – 2 Sheets.
C. Marsh 2nd.
Corn & Cotton Scraper &c.
Nº 112,161. Patented Feb. 28, 1871.
Fig. 3.     Fig. 1.     Fig. 4.    Fig. 5.
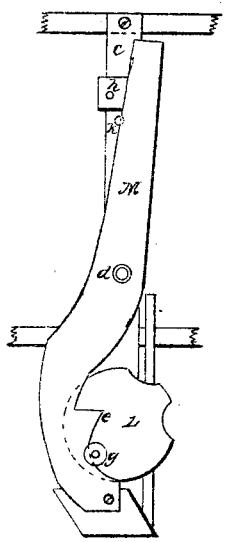
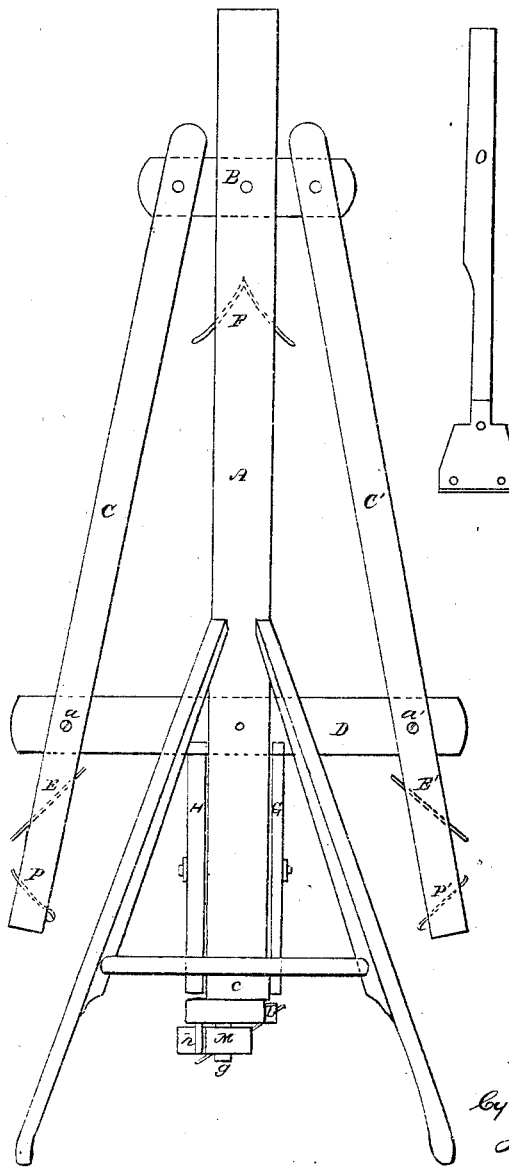
Witnesses.
Theodore Jay
Lewis Myers
Inventor
Cyrus Marsh 2d by
Saml. S. Boyd
Atty Sheet 2. 2 Sheets.
C. Marsh 2nd.
Corn & Cotton Scraper &c.
N° 112,161.    Patented Feb. 28, 1871.
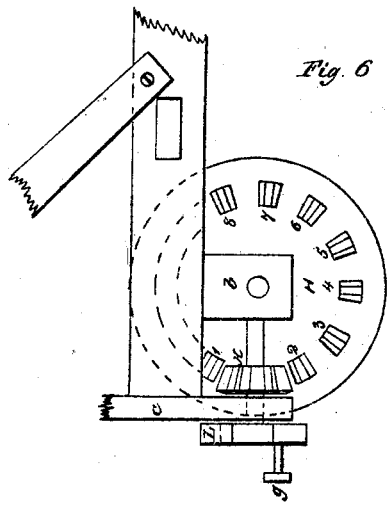
Fig. 6
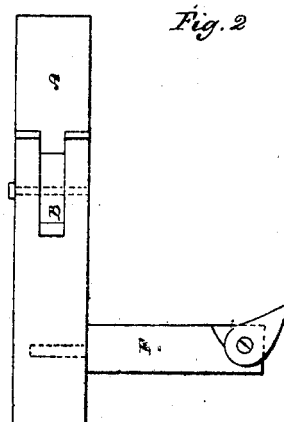
Fig. 2
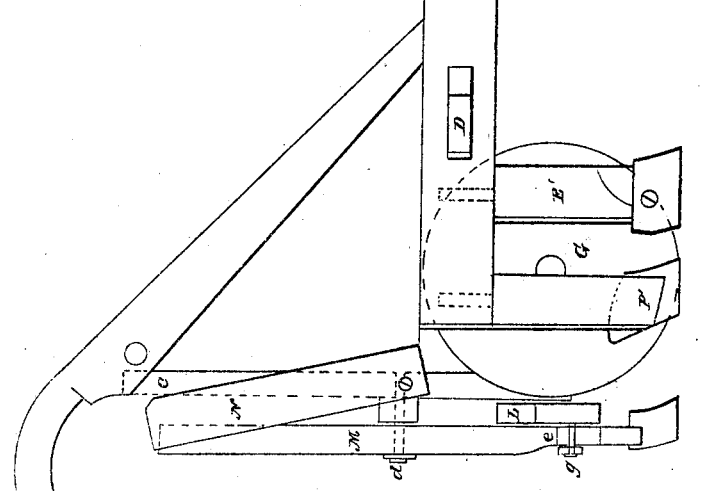
Witnesses
Theodore Jay
Lewis Myers.
Inventor.
Cyrus Marsh 2d by
Saml. S. Boyd
atty

UNITED STATES PATENT OFFICE.

CYRUS MARSH, 2D, OF NATCHEZ, MISSISSIPPI.

IMPROVEMENT IN CORN AND COTTON SCRAPERS, &c.

Specification forming part of Letters Patent No. 112,161, dated February 28, 1871.

*To all whom it may concern:*

Be it known that I, CYRUS MARSH, 2d, of Natchez, Adams county, State of Mississippi, have invented a new and useful Corn Scraper, Hiller, and Cultivator, of which the following is a full, clear, and exact description, reference being had to the annexed drawing, making a part of this specification, and in which—

Figures 1 and 2 represent, respectively, a top-plan and side view of my apparatus. Figs. 3 and 6 represent detached views of parts of same, hereinafter described.

Similar letters indicate like parts.

The object of my invention is to unite in one machine a corn scraper, hiller, and cultivator, the same being adapted for use in either capacity by simply interchanging and adjusting certain parts, thus combining in, practically, one machine all the implements required in the cultivation of a crop after the same has been planted.

The first working which corn receives after having been thinned out to an amount suited to the strength of the land is to be scraped, and this I perform by the machine now to be described.

A, Figs. 1, 2, represents the ordinary plow-beam, provided with handles, as shown, and having a cross-piece, B, to which are pivoted the arms C C', Fig. 1, C', Fig. 2, having slots near their ends to receive another cross-piece, D, on which they slide, being kept at any desired point on same by the set-screws *a a'*, Fig. 1.

Beneath the beam are two wheels, G and H, on a common shaft, having its bearings in an offset, *b*, Fig. 6, from the beam. The former of these wheels, G, Figs. 1, 2, is sharp on its edge, while the other, H, Figs. 1, 6, has a broad tread, and, if desired, may be made with a cogged periphery. The one is made sharp, so as to hold the machine to its course, and the latter made broad, as it is to act as a driving-wheel, as hereinafter described. This offset *b* and the upright *c*, Figs. 1, 2, 3, 6, afford bearings for the shaft of the pinion K, Fig. 6, and the wheel L, Figs. 1, 2, 3, 6, the pinion gearing with the cogs 1 2 3, &c., Fig. 6, on the inner face of the wheel H.

Pivoted to the upright *c*, at *d*, Figs. 2, 6, is a scraper, M, Figs. 1, 2, 3, having a projection, *e*, Figs. 2, 3, against which the pin *g*, Figs. 1, 2, 3, 6, on the wheel L, plays.

The revolution of the wheel L throws the scraper in one direction, while the spring N, Fig. 1, acting on its upper end, throws it in the other, the pin *h*, Figs. 1, 3, preventing the spring from carrying the end too far.

Having inserted the scrapers E E', Figs. 1, 2, the latter figure showing the manner of insertion, and having set the arms C C' to correspond to the width of the corn-hills, the machine is ready to scrape corn.

The wheels H and G run on either side of the hills, the scrapers E E' scrape the sides of the hills, and the scraper M the parts between the hills, the pin *g* on the wheel L throwing the scraper back, so as to permit it to pass each hill successively, and the spring N returning the scraper to its position after passing the hill.

By putting a second row of cogs on the wheel H, and making the pinion-shaft slide in its bearings, or the pinion slide on the shaft, so as to engage with this second row, the scraper M may be adjusted to scrape corn in hills of different distances apart.

After the corn is scraped, remove the scrapers E E', O, and M, and insert the hilling-plows P P', Fig. 1, P', Fig. 2, they being inserted in the same manner as E E', but considerably back of their position, as shown. These plows are set, as shown, so as to throw the furrow-slice toward the drills of corn. The wheels H and G, passing one on each side of the hills, receive the furrow thus thrown up by P P', preventing the small corn from being covered by the earth, and, as they pass on, allowing the earth to fall gradually and gently around the corn, and completing the hills.

When this process of hilling or molding is completed, the plows P P' are removed, and the wheels H and G also, and the double plow F, Figs. 1, 2, inserted, as shown, thus converting the machine into a cultivator to work among the corn till the crop is gathered.

In this one machine I have combined, as shown, all the implements necessary to the cultivation of a crop of corn.

What I claim as my invention, and desire to secure by Letters Patent, is—

A corn-scraper consisting of a beam, A, wheels H G, adjustable arms C C', scrapers E E' and M, the latter set in motion by the wheel H, through the pinion K, and wheel L, and all constructed and arranged as and for the purpose shown and specified.

Witnesses:         CYRUS MARSH, 2D.
S. L. GUICE,
V. WOOD.